(12) United States Patent
Wiese

(10) Patent No.: US 6,270,819 B1
(45) Date of Patent: Aug. 7, 2001

(54) PATCH BAG HAVING CURVED SEAL AND CURVED PATCH

(75) Inventor: Craig Alan Wiese, St. Joseph, MO (US)

(73) Assignee: Cryovac, Inc., Duncan, SC (US)

( * ) Notice: Subject to any disclaimer, the term of this patent is extended or adjusted under 35 U.S.C. 154(b) by 0 days.

(21) Appl. No.: 08/936,086

(22) Filed: Sep. 23, 1997

(51) Int. Cl.⁷ .................................................. B31B 1/90
(52) U.S. Cl. ........................ 426/129; 426/115; 426/127; 383/119
(58) Field of Search .................................. 426/115, 127, 426/129; 383/119

(56) References Cited

U.S. PATENT DOCUMENTS

| | | | |
|---|---|---|---|
| Re. 35,285 | 6/1996 | Quacquarella et al. | 428/34.9 |
| 3,383,746 | 5/1968 | Narduzzi et al. | 29/33.5 |
| 3,552,090 | 1/1971 | Roberts et al. | 53/71 |
| 3,628,576 | 12/1971 | Owens | 141/65 |
| 4,064,296 | 12/1977 | Bornstein et al. | 428/35 |
| 4,120,716 | 10/1978 | Bonet | 156/272 |
| 4,239,111 | 12/1980 | Conant et al. | 206/484 |
| 4,278,738 | 7/1981 | Brax et al. | 428/515 |
| 4,302,565 | 11/1981 | Goeke et al. | 526/88 |
| 4,302,566 | 11/1981 | Karol et al. | 526/125 |
| 4,539,236 | 9/1985 | Vilutis | 428/35 |
| 4,619,361 | 10/1986 | Thomas, Jr. | 206/204 |
| 4,755,403 | 7/1988 | Ferguson | 428/35 |
| 4,765,857 | 8/1988 | Ferguson | 156/229 |
| 4,879,430 | 11/1989 | Hoffman | 428/35.1 |
| 5,206,075 | 4/1993 | Hodgson, Jr. | 428/216 |
| 5,241,031 | 8/1993 | Mehta | 526/348.1 |
| 5,271,236 | 12/1993 | Lai et al | 526/348.5 |
| 5,278,272 | 1/1994 | Lai et al. | 526/348.5 |
| 5,540,646 | 7/1996 | Williams et al. | 493/210 |
| 5,545,419 | 8/1996 | Brady et al. | 426/129 |

FOREIGN PATENT DOCUMENTS

| | | |
|---|---|---|
| 654460 | 6/1951 | (GB) . |
| WO 90/03414 | 4/1990 | (WO) . |
| WO 93/03093 | 2/1993 | (WO) . |

OTHER PUBLICATIONS

Annual Book of ASTM Standards, D–2732, Standard Test Method for Unrestrained Linear Thermal Shrinkage of Plastic Film and Sheeting, 1989, pp. 368–371.

Journal of Polymer Science vol. 20, "Determination of Branching Distributions in Polyethylene and Ethylene Copolymers", Wild et al, 1982, pp. 441–455.

Primary Examiner—Curtis E. Sherrer
(74) Attorney, Agent, or Firm—Rupert B. Hurley, Jr.

(57) ABSTRACT

A patch bag has a convex bag edge and a convex seal inward of the convex bag edge. A patch is adhered to the bag. The patch covers at least a portion of the bag and has a convex patch edge. The patch covers at least a portion of the bag within the convex seal. A process for making the patch bag is also disclosed, as is a packaged product which utilizes the patch bag for the packaging of a bone-in meat product.

21 Claims, 7 Drawing Sheets

PATCH BAG HAVING CURVED SEAL AND CURVED PATCH

FIELD OF THE INVENTION

The present invention relates to packages for the packaging of bone-in meat products. More particularly, the present invention relates to a bag having a protective patch adhered directly thereto, the protective patch preventing of bone puncture, or reducing the likelihood of bone puncture.

BACKGROUND OF THE INVENTION

Patch bags are known for the packaging of bone-in meat products, such as whole bone-in pork a loins, etc. However, in the packaging of various meat products, even after placing the meat product in the bag, evacuating the atmosphere from the bag, sealing the open end of the bag, and shrinking the bag and patch by passing the packaged product through a shrink tunnel, the resulting packaged product exhibits excess film from the bag corners, commonly referred to as "dog ears." It would be desirable to reduce or eliminate the presence of the excess bag and patch film in the packaged product.

SUMMARY OF THE INVENTION

The present invention is directed to a patch bag having a bag which has an outwardly curved edge and an outwardly curved seal, and a patch having an outwardly curved edge. The patch is adhered to the bag in a region which is relatively close to the curved seal, with the curved edge of the patch preferably being relatively close to the curved seal, and substantially parallel to the curved seal, so that there is patch coverage in a region "within the curve of the seal," i.e., inward of the seal, on the "concave side" of the outwardly curved seal. In this manner, a patch bag is provided which, relative to patch bags of the prior art, has less excess bag film and/or less excess patch film, due to bag and/or patch corners which are otherwise present with a traditional rectangular patch bag. That is, the curved patch edge assists in minimizing the uncovered area of the bag which would otherwise occur if a square or rectangular patch is utilized in combination with a curved bag edge.

As a first aspect, the present invention is directed to a patch bag, comprising: (A) a bag having a convex bag edge; (B) a convex seal inward of the convex bag edge, the convex seal having a first seal endpoint and a second seal endpoint; and (C) a patch adhered to the bag. The patch has a convex patch edge, and the patch covers at least a portion of a region of the bag bounded by the convex seal and a straight line connecting the a first seal endpoint and the second seal endpoint.

Although the convex seal can be inward of the convex patch edge, preferably the convex seal is outward of the convex patch edge.

Although the patch bag can be an end-seal bag or a side-seal bag, preferably the patch bag is an end-seal bag, with the convex seal forming a bottom of the bag. A side seal patch bag according to the present invention has a convex seal which forms a side of the bag. In addition, the patch bag of the present invention can be a pouch having two straight side seals and a convex bottom seal.

Preferably, the bag comprises a first biaxially-oriented, heat-shrinkable film comprising an outside abuse layer, a core $O_2$-barrier layer, and an inside sealant layer, and the patch comprises a second biaxially-oriented, heat-shrinkable film. Preferably, the outside abuse layer of the bag comprises at least one member selected from the group consisting of ethylene/alpha-olefin copolymer having a density of from about 0.85 to 0.95, propylene/ethylene copolymer, polyamide, ethylene/vinyl acetate copolymer, ethylene/methyl acrylate copolymer, and ethylene/butyl acrylate copolymer. Preferably, the core $O_2$-barrier layer of the bag comprises at least one member selected from the group consisting of ethylene/vinyl alcohol copolymer, polyvinyl chloride, polyvinylidene chloride, polyamide, polyester, and polyacrylonitrile. Preferably, the inside sealant layer comprises at least one member selected from the group consisting of thermoplastic polyolefin, thermoplastic polyamide, thermoplastic polyester, and thermoplastic polyvinyl chloride. Preferably, the second biaxially-oriented, heat-shrinkable film comprises at least one member selected from the group consisting of ethylene/alpha-olefin copolymer having a density of from about 0.85 to 0.95, propylene/ethylene copolymer, polyamide, ethylene/vinyl acetate copolymer, ethylene/methyl acrylate copolymer, and ethylene/butyl acrylate copolymer.

Preferably, the bag comprises a heat-shrinkable film and the patch comprises a heat shrinkable film.

Optionally, the seal can be inward of the convex patch edge. Although such a seal can be through the patch but not through the bag, preferably such a seal is through the patch and the bag. Preferably, the bag having the seal through the patch but not through the bag is an end-seal bag.

Preferably, the seal is outward of the convex patch edge. Preferably, the patch is adhered to an outside surface of the bag. Although the patch can have a width which is greater than, equal to, or less than the width of the bag. The bag can have one patch, two patches, or more than two patches adhered thereto. In one preferred embodiment, the bag has a first patch adhered to a first lay-flat side of the bag, and a second patch adhered to a second lay-flat side of the bag. Although the patch(es) can be adhered to the inside surface of the bag, preferably the patches are adhered to the outside surface of the bag. Preferably, the two patches are substantially aligned with one another when the patch bag is in its lay-flat position.

As a second aspect, the present invention pertains to a process for making a patch bag, comprising: (A) cutting a patch from a first film, the patch having a convex edge; (B) adhering the patch to a bag film; and (C) sealing the bag film to itself or another film so that a patch bag having a convex seal having a first seal endpoint and a second seal endpoint is produced. The patch covers at least a portion of a region of the bag surface bounded by the convex seal and a straight line connecting the first seal endpoint and the second seal endpoint.

As a third aspect, the present invention pertains to a packaged product, which comprises a patch bag an a meat product in the patch bag. The patch bag is in accordance with the patch bag according to the present invention. The meat product comprises bone. Preferably, the meat product comprises at least one member selected from the group consisting of poultry, pork, beet lamb, goat, horse, and fish. More preferably, the meat product comprises at least one member selected from the group consisting of ham, sparerib, picnic, back rib, short loin, short rib, whole turkey, and pork loin. Still more preferably, the meat product comprises bone-in ham, including both smoked and processed ham, fresh bone-in ham, turkey, chicken, and beef shank.

DETAILED DESCRIPTION OF THE INVENTION

Figure 1:
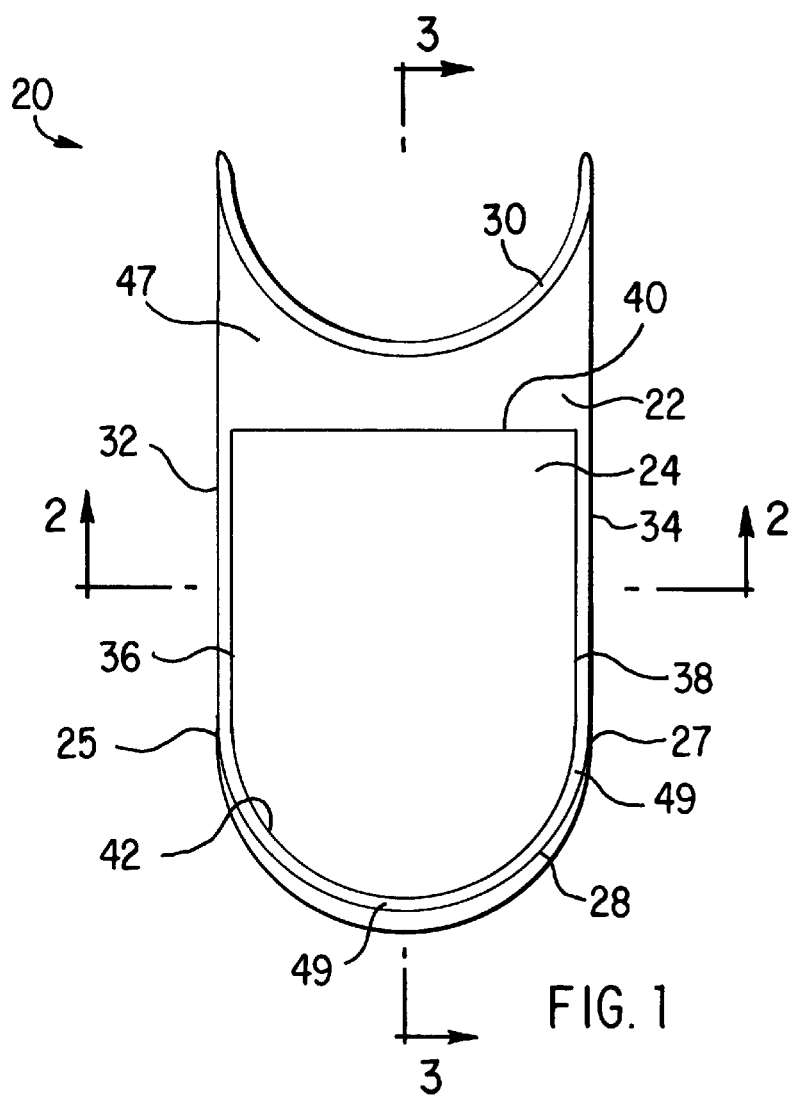
FIG. 1 illustrates a schematic view of a preferred end-seal patch bag according to the present invention, in a lay-flat view.

As used herein, the term "bag" is inclusive of end-seal bag, side-seal bag, and pouch. Pouches can have both a bottom seal and two side seals, or a bottom seal and one side seal. End seal bags have only a bottom seal. Side seal bags have both sides sealed, with no bottom seal.

As used herein, the phrase "uncovered portion of the bag" refers to a portion of the bag which is not covered by a patch, i.e., a portion of the bag having both its inside surface and its outside surface not adhered to, or otherwise covered by, one or more patches.

The bag "edge," or "side edge," or "sideline," or "bottom edge," or "bottomline," is formed either by a mere "fold" in the bag, or is a cut film edge having a seal inward thereof. Although folded edges need not contain a crease, in reality the folded side edges of end seal bags, and the folded bottom edge of a side seal bag, are creased by processing rollers in the manufacture of the tubing into end-seal and side-seal bags. However, the edge, sideline, or bottomline also includes bag side and bottom edges which are relatively small regions (i.e., 0.05 inches to either side of the "line") extending from a seal through both the patch and the underlying bag. Bag edges, sidelines, and bottomlines are determined by placing an empty bag on a flat supporting surface, with the seals and creased edges flat against the supporting surface, i.e., in lay-flat configuration. The perimeter of the bag in its lay-flat configuration determines the edges, sidelines, and bottomline. In contrast to the bottom edge of an end-seal bag, or the bottomline of a side-seal bag, the functional "bottom" of an end-seal bag is formed by the end seal itself.

As used herein, the term "inward" is used with respect to a bag edge, a patch edge, or a seal, and refers to a region of the bag, patch, or patch bag, this region extending from the referenced edge or seal to the center of the patch bag, in lay-flat configuration. Likewise, as used herein, the term "outward" is used with respect to a bag edge, patch edge, or seal, and refers to the region of the bag, patch, or patch bag, this region extending from the referenced edge or seal out and away from the center of the patch bag, in lay-flat configuration.

As used herein, the word "convex" is used with respect to a bag edge, a patch edge, or a seal, and refers to the edge or seal having a curved shape which, when viewed from a position outward from the edge or seal, presents an outwardly curved line, surface, or shape. Likewise, as used herein, the word "concave" is used with respect to a bag edge, a patch edge, or a seal, and refers to the edge or seal having a curved shape which, when viewed from a position inward of the edge or seal and in the plane of the edge or seal, presents an inwardly curving line, surface, or shape.

As used herein, the phrase "inward of the patch" refers to that region of the patch bag which extends from any edge, of any patch thereon, towards the center of the bag, when the bag is in a lay-flat position, i.e., which extends from a patch edge towards the portion of the bag which surrounds a product within the bag.

As used herein, the phrase "patches substantially aligned when the patch bag is in the lay-flat position" refers to patch alignment, when the patch bag is in its lay-flat position, so that at least one edge of one of the patches is within 0.5 inches of a corresponding edge of the other patch, preferably, within 0.2 inch, more preferably, within 0.1 inch. Preferably, at least the curved edges are in alignment with one another. More preferably, each of the patches have four sides (three straight sides and one curved side), with each of the edges of each of the patches being substantially aligned with the corresponding edge of the other patch.

As used herein, the term "film" is used in a generic sense to include plastic web, regardless of whether it is film or sheet. Preferably, films of and used in the present invention have a thickness of 0.25 mm or less. As used herein, the term "package" refers to packaging materials used in the packaging of a product.

As used herein, the phrase "patch overhang region", or "overhang", refers to that portion of a patch which extends beyond: (a) a side edge of the bag to which the patch is adhered, or (b) a bottom edge of the bag to which the patch is adhered, when the bag is in a lay-flat configuration, i.e., when the factory seal(s) is flat against a surface on which the bag has been placed. The patch bag according to the present invention can have one or more patches which overhang bottom and/or side edges of the bag.

The "factory seal" includes any and all seals necessary to convert a film tubing or flat film into a bag having an open top. Such seals are made at the bag-making factory, and hence are herein termed to be "factory seals".

As used herein, the phrases "seal layer", "sealing layer", "heat seal layer", and "sealant layer", refer to an outer film layer, or layers, involved in the sealing of the film to itself another film layer of the same or another film, and/or another article which is not a film. It should also be recognized that in general, up to the outer 3 mils of a film can be involved in the sealing of the film to itself or another layer. With respect to packages having only fin-type seals, as opposed to lap-type seals, the phrase "sealant layer" generally refers to the inside film layer of a package, as well as supporting layers adjacent this sealant layer, the inside layer frequently also serving as a food contact layer in the packaging of foods. In general, a sealant layer to be sealed by heat-sealing can comprise any thermoplastic polymer; preferably, the heat-sealing layer comprises, for example, thermoplastic polyolefin, thermoplastic polyamide, thermoplastic polyester, and thermoplastic polyvinyl chloride; more preferably, thermoplastic polyolefin, still more preferably, thermoplastic polyolefin having less than 60 weight percent crystallinity. Preferred sealant compositions are the same as the compositions for the abuse layer, as set forth below.

As used herein, the term "seal" refers to any seal of a first region of a film surface to a second region of a film surface, wherein the seal is formed by heating the regions to at least their respective seal initiation temperatures. The heating can be performed by any one or more of a wide variety of manners, such as using a heated bar, hot air, infrared radiation, ultrasonic sealing, etc.

As used herein, the term "barrier", and the phrase "barrier layer", as applied to films and/or film layers, is used with reference to the ability of a film or film layer to serve as a barrier to one or more gases. Oxygen (i.e., $O_2$) barrier layers can comprise, for example, ethylene/vinyl alcohol copolymer, polyvinyl chloride, polyvinylidene chloride, polyamide, polyester, polyacrylonitrile, etc., as known to those of skill in the art; preferably, the oxygen barrier layer comprises ethylene/vinyl alcohol copolymer, polyvinyl chloride, polyvinylidene chloride, and polyamide; more preferably, vinylidene chloride/methyl acrylate copolymer, as known to those of skill in the art.

As used herein, the phrase "abuse layer", as well as the phrase "puncture-resistant layer", refer to an outer film layer and/or an inner film layer, so long as the film layer serves to resist abrasion, puncture, and other potential causes of reduction of package integrity, as well as potential causes of reduction of package appearance quality. Abuse layers can comprise any polymer, so long as the polymer contributes to achieving an integrity goal and/or an appearance goal; preferably, abuse layers comprise polymer comprising at least one member selected from the group consisting of ethylene/alpha-olefin copolymer having a density of from about 0.85 to 0.95, propylene/ethylene copolymer, polyamide, ethylene/vinyl acetate copolymer, ethylene/methyl acrylate copolymer, and ethylene/butyl acrylate copolymer, etc. as known to those of skill in the art; more preferably, ethylene/vinyl acetate copolymer and ethylene/alpha-olefin copolymer having a density of from about 0.91 to 0.93; still more preferably, the abuse layer of the bag film comprises 85–100 weight percent ethylene/vinyl acetate copolymer, and 0–15 weight percent LLDPE, while the still more preferred abuse layer of the patch film comprises 85–100 weight percent LLDPE and 0–15 weight percent ethylene/vinyl acetate copolymer having a vinyl acetate content of about 9 percent.

As used herein, the term "core", and the phrase "core layer", as applied to multilayer films, refer to any internal film layer which has a primary function other than serving as an adhesive or compatibilizer for adhering two layers to one another. Usually, the core layer or layers provide the multilayer film with a desired level of strength, i.e., modulus, and/or optics, and/or added abuse resistance, and/or specific impermeability.

As used herein, the phrase "tie layer" refers to any internal layer having the primary purpose of adhering two layers to one another. Tie layers can comprise any polymer having a polar group grafted thereon, so that the polymer is capable of covalent bonding to polar polymers such as polyamide and ethylene/vinyl alcohol copolymer; preferably, tie layers comprise at least one member selected from the group consisting of polyolefin, modified polyolefin, ethylene/vinyl acetate copolymer, modified ethylene/vinyl acetate copolymer, and homogeneous ethylene/alpha-olefin copolymer, more preferably, tie layers comprise at least one member selected from the group consisting of anhydride modified grafted linear low density polyethylene, anhydride grafted low density polyethylene, homogeneous ethylene/alpha-olefin copolymer, and anhydride grafted ethylene/vinyl acetate copolymer.

As used herein, the term "lamination", the term "laminate", and the phrase "laminated film", refer to the process, and resulting product, made by bonding together two or more layers of film or other materials. Lamination can be accomplished by joining layers with adhesives, joining with heat and pressure, and even spread coating and extrusion coating. The term laminate is also inclusive of coextruded multilayer films comprising one or more tie layers.

As used herein, the term "oriented" refers to a polymer-containing material which has been stretched at an elevated temperature (the orientation temperature), followed by being "set" in the stretched configuration by cooling the material while substantially retaining the stretched dimensions. Upon subsequently heating unrestrained, unannealed, oriented polymer-containing material to its orientation temperature, heat shrinkage is produced almost to the original unstretched, i.e., pre-oriented dimensions. More particularly, the term "oriented", as used herein, refers to oriented films, wherein the orientation can be produced in one or more of a variety of manners.

As used herein, the phrase "orientation ratio" refers to the multiplication product of the extent to which the plastic film material is expanded in several directions, usually two directions perpendicular to one another. Expansion in the machine direction is herein referred to as "drawing", whereas expansion in the transverse direction is herein referred to as "stretching". For films extruded through an annular die, stretching is obtained by "blowing" the film to produce a bubble. For such films, drawing is obtained by passing the film through two sets of powered nip rolls, with the downstream set having a higher surface speed than the upstream set, with the resulting draw ratio being the surface speed of the downstream set of nip rolls divided by the surface speed of the upstream set of nip rolls. The degree of orientation is also referred to as the orientation ratio, or sometimes as the "racking ratio".

As used herein, the phrases "heat-shrinkable," "heat-shrink" and the like refer to the tendency of a film, generally an oriented film, to shrink upon the application of heat, i.e., to contract upon being heated, such that the size (area) of the film decreases while the film is in an unrestrained state decreases. Likewise, the tension of a heat-shrinkable film increases upon the application of heat if the film is restrained from shrinking. As a corollary, the phrase "heat-contracted" refers to a heat-shrinkable film, or a portion thereof, which has been exposed to heat such that the film or portion thereof is in a heat-shrinken state, i.e., reduced in size (unrestrained) or under increased tension (restrained). Preferably, the heat shrinkable film has a total free shrink (i.e., machine direction plus transverse direction), as measured by ASTM D 2732, of at least as 5 percent, more preferably at least 7 percent, still more preferably, at least 10 percent, and, yet still more preferably, at least 20 percent.

As used herein, the term "monomer" refers to a relatively simple compound, usually containing carbon and of low molecular weight, which can react to form a polymer by combining with itself or with other similar molecules or compounds.

As used herein, the term "comonomer" refers to a monomer which is copolymerized with at least one different monomer in a copolymerization reaction, the result of which is a copolymer.

As used herein, the term "polymer" refers to the product of a polymerization reaction, and is inclusive of homopolymers, copolymers, terpolymers, etc. In general, the layers of a film can consist essentially of a single polymer, or can have still additional polymers together therewith, i.e., blended therewith.

As used herein, the term "homopolymer" is used with reference to a polymer resulting from the polymerization of a single monomer, i.e., a polymer consisting essentially of a single type of repeating unit.

As used herein, the term "copolymer" refers to polymers formed by the polymerization reaction of at least two different monomers. For example, the term "copolymer" includes the copolymerization reaction product of ethylene and an alpha-olefin, such as 1-hexene. However, the term "copolymer" is also inclusive of; for example, the copolymerization of a mixture of ethylene, propylene, 1-hexene, and 1-octene.

As used herein, the term "copolymerization" refers to the simultaneous polymerization of two or more monomers. As used herein, a copolymer identified in terms of a plurality of monomers, e.g., "propylene/ethylene copolymer", refers to a copolymer in which either monomer may copolymerize in a higher weight or molar percent than the other monomer or monomers. However, the first listed monomer preferably polymerizes in a higher weight percent than the second listed monomer, and, for copolymers which are terpolymers, quadripolymers, etc., preferably the first monomer copolymerizes in a higher weight percent than the second monomer, and the second monomer copolymerizes in a higher weight percent than the third monomer, etc.

As used herein, copolymers are identified, i.e., named, in terms of the monomers from which the copolymers are produced. For example, the phrase "propylene/ethylene copolymer" refers to a copolymer produced by the copolymerization of both propylene and ethylene, with or without additional comonomer(s). A copolymer comprises recurring "mer units,", i.e., "mers," which are units of a polymer, each of which are derived from a monomer used in the polymerization reaction. For example, the phrase "alpha-olefin mer" refers to a unit in, for example, an ethylene/alpha-olefin copolymer, the polymerization unit being that "residue" which is derived from the alpha-olefin monomer after it reacts to become a portion of the polymer chain, i.e., that portion of the polymer contributed by an individual alpha-olefin monomer after it reacts to become a portion of the polymer chain, as it no longer contains the double bond present in the alpha-olefin monomer.

As used herein, terminology employing a "/" with respect to the chemical identity of a copolymer (e.g., "an ethylene/alpha-olefin copolymer"), identifies the comonomers which are copolymerized to produce the copolymer. As used herein, "ethylene alpha-olefin copolymer" is the equivalent of "ethylene/alpha-olefin copolymer."

As used herein, the phrase "heterogeneous polymer" refers to polymerization reaction products of relatively wide variation in molecular weight and relatively wide variation in composition distribution, i.e., typical polymers prepared, for example, using conventional Ziegler-Natta catalysts. Heterogeneous polymers are useful in various layers of the film used in the present invention. Although there are a few exceptions (such as TAFMER (TM) ethylene/alpha-olefin copolymers produced by Mitsui Petrochemical Corporation), heterogeneous polymers typically contain a relatively wide variety of chain lengths and comonomer percentages.

As used herein, the phrase "heterogeneous catalyst" refers to a catalyst suitable for use in the polymerization of heterogeneous polymers, as defined above. Heterogeneous catalysts are comprised of several kinds of active sites which differ in Lewis acidity and steric environment. Ziegler-Natta catalysts are heterogeneous catalysts. Examples of Ziegler-Natta heterogeneous systems include metal halides activated by an organometallic co-catalyst, such as titanium chloride, optionally containing magnesium chloride, complexed to trialkyl aluminum, as is disclosed in patents such as U.S. Pat. No. 4,302,565, to GOEKE, et. al., and U.S. Pat. No. 4,302,566, to KAROL, et. al., both of which are hereby incorporated, in their entireties, by reference thereto.

As used herein, the phrase "homogeneous polymer" refers to polymerization reaction products of relatively narrow molecular weight distribution and relatively narrow composition distribution Homogeneous polymers are useful in various layers of the multilayer film used in the present invention. Homogeneous polymers are structurally different from heterogeneous polymers, in that homogeneous polymers exhibit a relatively even sequencing of comonomers within a chain, a mirroring of sequence distribution in all chains, and a similarity of length of all chains, i.e., a narrower molecular weight distribution. Furthermore, homogeneous polymers are typically prepared using metallocene, or other single-site type catalysis, rather than using Ziegler Natta catalysts.

More particularly, homogeneous ethylene/alpha-olefin copolymers may be characterized by one or more methods known to those of skill in the art, such as molecular weight distribution ($M_w/M_n$), composition distribution breadth index (CDBI), and narrow melting point range and single melt point behavior. The molecular weight distribution ($M_w/M_n$), also known as polydispersity, may be determined by gel permeation chromatography. The homogeneous ethylene/alpha-olefin copolymers useful in this invention generally has ($M_w/M_n$) of less than 2.7; preferably from about 1.9 to 2.5; more preferably, from about 1.9 to 2.3. The composition distribution breadth index (CDBI) of such homogeneous ethylene/alpha-olefin copolymers will generally be greater than about 70 percent. The CDBI is defined as the weight percent of the copolymer molecules having a comonomer content within 50 percent (i.e., plus or minus 50%) of the median total molar comonomer content. The CDBI of linear polyethylene, which does not contain a comonomer, is defined to be 100%. The Composition Distribution Breadth Index (CDBI) is determined via the technique of Temperature Rising Elution Fractionation (TREF). CDBI determination clearly distinguishes the homogeneous copolymers used in the present invention (narrow composition distribution as assessed by CDBI values generally above 70%) from VLDPEs available commercially which generally have a broad composition distribution as assessed by CDBI values generally less than 55%. The CDBI of a copolymer is readily calculated from data obtained from techniques known in the art, such as, for example, temperature rising elution fractionation as described, for example, in Wild et. al., *J. Poly. Sci. Poly. Phys. Ed.,* Vol. 20, p.441 (1982). Preferably, the homogeneous ethylene/alpha-olefin copolymers have a CDBI greater than about 70%, i.e., a CDBI of from about 70% to 99%. In general, the homogeneous ethylene/alpha-olefin copolymers in the multilayer films of the present invention also exhibit a relatively narrow melting point range, in comparison with "heterogeneous copolymers", i.e., polymers having a CDBI of less than 55%. Preferably, the homogeneous ethylene/alpha-olefin copolymers exhibit an essentially singular melting point characteristic, with a peak melting point ($T_m$), as determined by Differential Scanning Colorimetry (DSC), of from about 60° C. to 110° C. Preferably the homogeneous copolymer has a DSC peak $T_m$ of from about 80° C. to 100° C. As used herein, the phrase "essentially single melting point" means that at least about 80%, by weight, of the material corresponds to a single $T_m$ peak at a temperature within the range of from about 60° C. to 110° C., and essentially no substantial fraction of the material has a peak melting point in excess of about 115° C., as determined by DSC analysis. DSC measurements are made on a Perkin Elmer System 7 Thermal Analysis System. Melting information reported are second melting data, i.e., the sample is heated at a programmed rate of 10° C./min. to a temperature below its critical range. The sample is then reheated (2nd melting) at a programmed rate of 10° C./min. The presence of higher melting peaks is detrimental to film properties such as haze, and compromises the chances for meaningful reduction in the seal initiation temperature of the final film.

A homogeneous ethylene/alpha-olefin copolymer can, in general, be prepared by the copolymerization of ethylene and any one or more alpha-olefin. Preferably, the alpha-olefin is a $C_3$–$C_{20}$ alpha-monoolefin, more preferably, a $C_4$–$C_{12}$ alpha-monoolefin, still more preferably, a $C_4$–$C_8$ alpha-monoolefin. Still more preferably, the alpha-olefin comprises at least one member selected from the group consisting of butene-1, hexene-1, and octene-1, i.e., 1-butene, 1-hexene, and 1-octene, respectively. Most preferably, the alpha-olefin comprises octene-1, and/or a blend of hexene-1 and butene-1.

Processes for preparing and using homogeneous polymers are disclosed in U.S. Pat. No. 5,206,075, U.S. Pat. No. 5,241,031, and PCT International Application WO 93/03093, each of which is hereby incorporated by reference thereto, in its entirety. Further details regarding the production and use of homogeneous ethylene/alpha-olefin copolymers are disclosed in PCT International Publication Number WO 90/03414, and PCT International Publication Number WO 93/03093, both of which designate Exxon Chemical Patents, Inc. as the Applicant, and both of which are hereby incorporated by reference thereto, in their respective entireties.

Still another genus of homogeneous ethylene/alpha-olefin copolymers is disclosed in U.S. Pat. No. 5,272,236, to LAI, et. al., and U.S. Pat. No. 5,278,272, to LAI, et. al., both of which are hereby incorporated by reference thereto, in their respective entireties. Each of these patents disclose substantially linear homogeneous long chain branched ethylene/alpha-olefin copolymers produced and marketed by The Dow Chemical Company.

As used herein, the term "polyolefin" refers to any polymerized olefin, which can be linear, branched, cyclic, aliphatic, aromatic, substituted, or unsubstituted. More specifically, included in the term polyolefin are homopolymers of olefin, copolymers of olefin, copolymers of an olefin and an non-olefinic comonomer copolymerizable with the olefin, such as vinyl monomers, modified polymers thereof and the like. Specific examples include polyethylene homopolymer, polypropylene homopolymer, polybutene, ethylene/alpha-olefin copolymer, propylene/alpha-olefin copolymer, butene/alpha-olefin copolymer, ethylene/vinyl acetate copolymer, ethylene/ethyl acrylate copolymer, ethylene/butyl acrylate copolymer, ethylene/methyl acrylate copolymer, ethylene/acrylic acid copolymer, ethylene/methacrylic acid copolymer, modified polyolefin resin, ionomer resin, polymethylpentene, etc. Modified polyolefin resin is inclusive of modified polymer prepared by copolymerizing the homopolymer of the olefin or copolymer thereof with an unsaturated carboxylic acid, e.g., maleic acid, fumaric acid or the like, or a derivative thereof such as the anhydride, ester or metal salt or the like. It could also be obtained by incorporating into the olefin homopolymer or copolymer, an unsaturated carboxylic acid, e.g., maleic acid, fumaric acid or the like, or a derivative thereof such as the anhydride, ester or metal salt or the like.

As used herein, terms identifying polymers, such as "polyamide", "polyester", "polyurethane", etc. are inclusive of not only polymers comprising repeating units derived from monomers known to polymerize to form a polymer of the named type, but are also inclusive of comonomers, derivatives, etc. which can copolymerize with monomers known to polymerize to produce the named polymer. For example, the term "polyamide" encompasses both polymers comprising repeating units derived from monomers, such as caprolactam, which polymerize to form a polyamide, as well as copolymers derived from the copolymerization of caprolactam with a comonomer which when polymerized alone does not result in the formation of a polyamide. Furthermore, terms identifying polymers are also inclusive of mixtures, blends, etc. of such polymers with other polymers of a different type.

As used herein, the phrase "modified polymer", as well as more specific phrases such as "modified ethylene/vinyl acetate copolymer", and "modified polyolefin" refer to such polymers having an anhydride functionality grafted thereon and/or copolymerized therewith and/or blended therewith. Preferably, such modified polymers have the anhydride functionality grafted on or polymerized therewith, as opposed to merely blended therewith. As used herein, the phrase "anhydride-containing polymer" and "anhydride-modified polymer", refer to one or more of the following: (1) polymers obtained by copolymerizing an anhydride-containing monomer with a second, different monomer, and (2) anhydride grafted copolymers, and (3) a mixture of a polymer and an anhydride-containing compound.

As used herein, the phrase "ethylene alpha-olefin copolymer", and "ethylene/alpha-olefin copolymer", refer to such heterogeneous materials as linear low density polyethylene (LLDPE), and very low and ultra low density polyethylene (VLDPE and ULDPE); and homogeneous polymers such as metallocene catalyzed polymers such as EXACT (TM) resins obtainable from the Exxon Chemical Company, and TAFMER (TM) resins obtainable from the Mitsui Petrochemical Corporation. All these materials generally include copolymers of ethylene with one or more comonomers selected from $C_4$ to $C_{10}$ alpha-olefin such as butene-1 (i.e., 1-butene), hexene-1, octene-1, etc. in which the molecules of the copolymers comprise long chains with relatively few side chain branches or cross-linked structures. This molecular structure is to be contrasted with conventional low or medium density polyethylenes which are more highly branched than their respective counterparts. The heterogeneous ethylene/alpha-olefin commonly known as ULDPE has a density usually in the range of from about 0.91 grams per cubic centimeter to about 0.94 grams per cubic centimeter. Other ethylene/alpha-olefin a copolymers, such as the long chain branched homogeneous ethylene/alpha-olefin copolymers available from the Dow Chemical Company, known as AFFINITY (TM) resins, are also included as another type of homogeneous ethylene alpha-olefin copolymer useful in the present invention.

In general, the ethylene/alpha-olefin copolymer comprises a copolymer resulting from the copolymerization of from about 80 to 99 weight percent ethylene and from 1 to 20 weight percent alpha-olefin. Preferably, the ethylene/alpha-olefin copolymer comprises a copolymer resulting from the copolymerization of from about 85 to 95 weight percent ethylene and from 5 to 15 weight percent alpha-olefin.

As used herein, the phrases "inner layer" and "internal layer" refer to any layer, of a multilayer film, having both of its principal surfaces directly adhered to another layer of the film.

As used herein, the phrase "outer layer" refers to any film layer of film having less than two of its principal surfaces directly adhered to another layer of the film. The phrase is inclusive of monolayer and multilayer films. In multilayer films, there are two outer layers, each of which has a principal surface adhered to only one other layer of the multilayer film. In monolayer films, there is only one layer, which, of course, is an outer layer in that neither of its two principal surfaces are adhered to another layer of the film.

As used herein, the phrase "inside layer" refers to the outer layer, of a multilayer film packaging a product, which is closest to the product, relative to the other layers of the multilayer film.

As used herein, the phrase "outside layer" refers to the outer layer, of a multilayer film packaging a product, which is furthest from the product relative to the other layers of the multilayer film. Likewise, the "outside surface" of a bag is the surface away from the product being packaged within the bag.

As used herein, the term "adhered" is inclusive of films which are directly adhered to one another using a heat seal or other means, as well as films which are adhered to one another using an adhesive which is between the two films.

As used herein, the phrase "directly adhered", as applied to film layers, is defined as adhesion of the subject film layer to the object film layer, without a tie layer, adhesive, or other layer therebetween. In contrast, as used herein, the word "between", as applied to a film layer expressed as being between two other specified layers, includes both direct adherence of the subject layer between to the two other layers it is between, as well as including a lack of direct adherence to either or both of the two other layers the subject layer is between, i.e., one or more additional layers can be imposed between the subject layer and one or more of the layers the subject layer is between.

As used herein, the phrase "machine direction", herein abbreviated "MD", refers to a direction "along the length" of the film, i.e., in the direction of the film as the film is formed during extrusion and/or coating.

As used herein, the phrase "transverse direction", herein abbreviated "MD", refers to a direction across the film, perpendicular to the machine or longitudinal direction Although the films used in the patch bag according to the present invention can be monolayer films or multilayer films, the patch bag comprises at least two films laminated together. Preferably, the patch bag is comprised of films which together comprise a total of from 2 to 20 layers; more preferably, from 2 to 12 layers; and still more preferably, from 4 to 9 layers.

Figure 2:
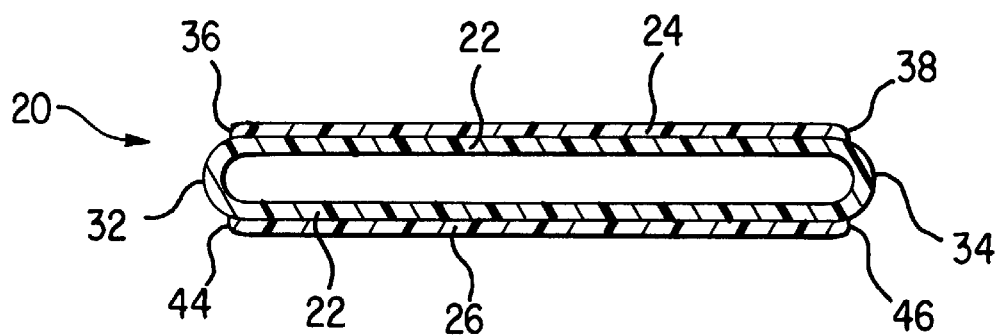
FIG. 2 illustrates a cross-sectional view of the end-seal patch bag illustrated in FIG. 1, taken through section 2—2 of FIG. 1.
Figure 3:
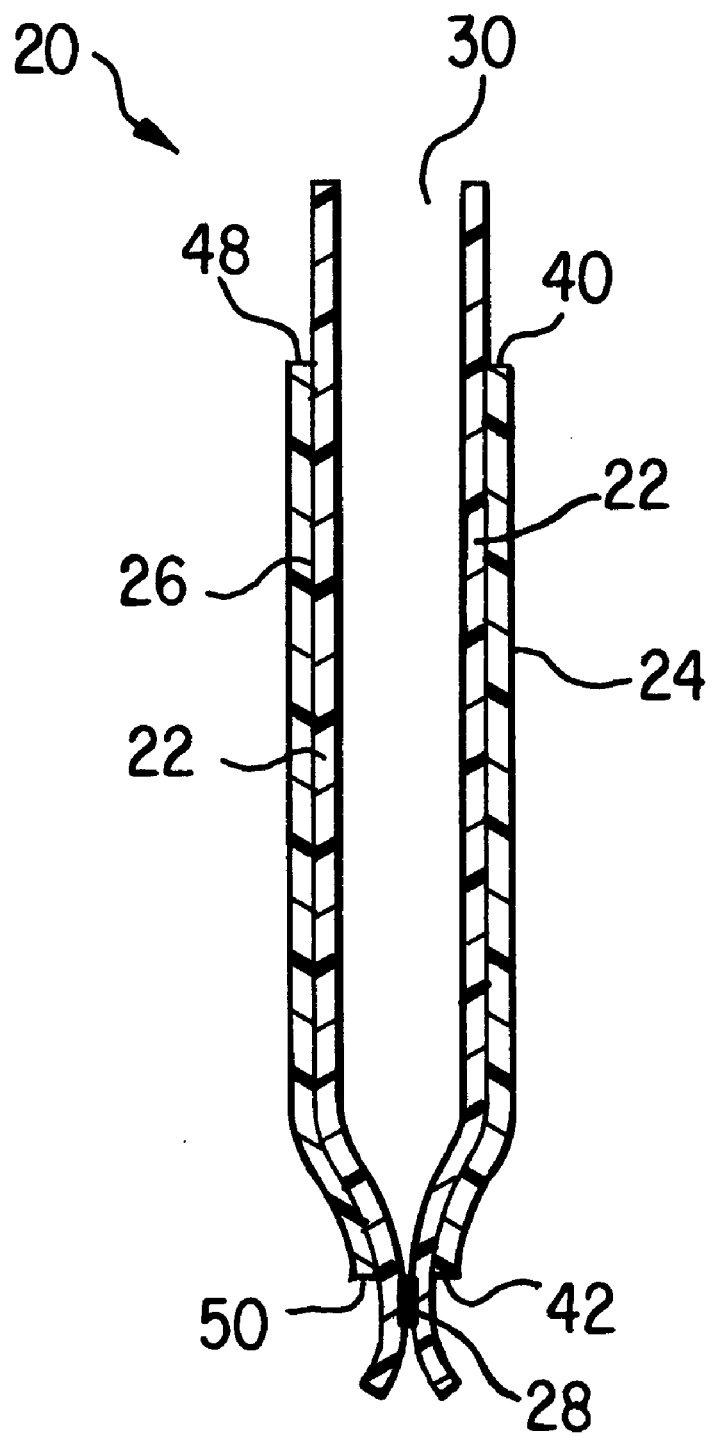
FIG. 3 illustrates a cross-sectional view of the end-seal patch bag illustrated in FIG. 1, taken through section 3—3 of FIG. 1.

In general, the multilayer film(s) used in the present invention can have any total thickness desired, so long as the film provides the desired properties for the particular packaging operation in which the film is used, e.g. abuse-resistance (especially puncture-resistance), modulus, seal strength, optics, etc. FIG. 1 is a lay-flat view of a preferred patch bag 20, in a lay-flat position, this patch bag being in accordance with the present invention; FIG. 2 is a transverse cross-sectional view of patch bag 20, taken through section 2—2 of FIG. 1; and, FIG. 3 is a longitudinal cross-sectional view of patch bag 20 taken through section 3—3 of FIG. 1. Viewing FIGS. 1, 2, and 3 together, patch bag comprises bag 22, first patch 24, and second patch 26. Patch bag 20 has convex end-seal 28, open top 30, first bag side edge 32, and second bag side edge 34. First patch 24 has patch side edges 36 and 38, top edge 40, and bottom convex edge 42. Second patch 26 has side edges 44 and 46, top edge 48, and convex bottom edge 50.

Convex end-seal 28 is preferably substantially parallel to convex bottom edge 50. Depending upon the product to be packaged, it may be preferred to provide convex end-seal 28 and convex bottom edge 50 with a single-radius curvature (i.e., a constant radius curvature), a multiple-radius curvature, or a parabolic curvature.

That portion of bag 22 to which first patch 24 is adhered is "covered", i.e., protected, by first patch 24; likewise for second patch 26. Upper and lower end portions 47 and 49 (respectively) of patch bag 20 are not covered by front patch 24, for ease in producing heat seals can be made through bag 22, including factory seal 28 and a customer seal, to be made after a product is inserted into patch bag 20, without having to seal through first patch 24 and/or second patch 26. Sealing through one or more of patches 24 and 26 requires more heat, and could result in bum through and/or a weaker seal.

Preferably, the film stock from which the patches are cut has a total thickness of from about 2 to 8 mils; more preferably, from about 3 to 6 mils. Preferably, the distance between distance between patch edge and seal is kept to a minimum, in order to keep to a minimum the amount of bag film which is not covered by a patch. For example, it is preferred to have the patch within from 0.1 to 2 inches of the seal, more preferably from 0.2 to 1 inch of the seal, still more preferably from 0.3 to 0.8 inch of the seal. If the seal is made through the patch film as well as the bag film, preferably the seal is made using a heat seal wire having a flat cross-section, as described in U.S. Ser. No. 60/042664, in the name of DePoorter et al, entitled "PATCH BAG HAVING SEAL THROUGH PATCHES," filed Apr. 4, 1997, the entirety of which is hereby incorporated by reference thereto.

Although patches 24 and 26 need not be the same size and need not be substantially aligned with one another, preferably the patches are substantially the same size, and preferably the patches are substantially aligned with one another. As can be seen from FIGS. 2 and 3, since patch bag 20 has a symmetrical cross-section, which of the two patches is the "first patch" and which is the "second patch" is arbitrary, depending upon which side of the bag is placed down when patch bag 20 is placed in its lay-flat position.

As can be seen in FIGS. 1, 2, and 3, taken together, patches 24 and 26 cover a portion of the bag within the convex seal. That is, the phrase "a portion of the bag within the convex seal," refers to a region of the bag surface encompassed by (a) the convex seal (i.e., the curved seal which presents a convex surface viewed from a point directly outward from the seal), taken together with (b) a straight line connecting the two seal endpoints. In the end-seal bag of FIGS. 1, 2, and 3, seal endpoints 25 and 27 are the points at which the seals intersect the sides of the end-seal bag.

Figure 4:
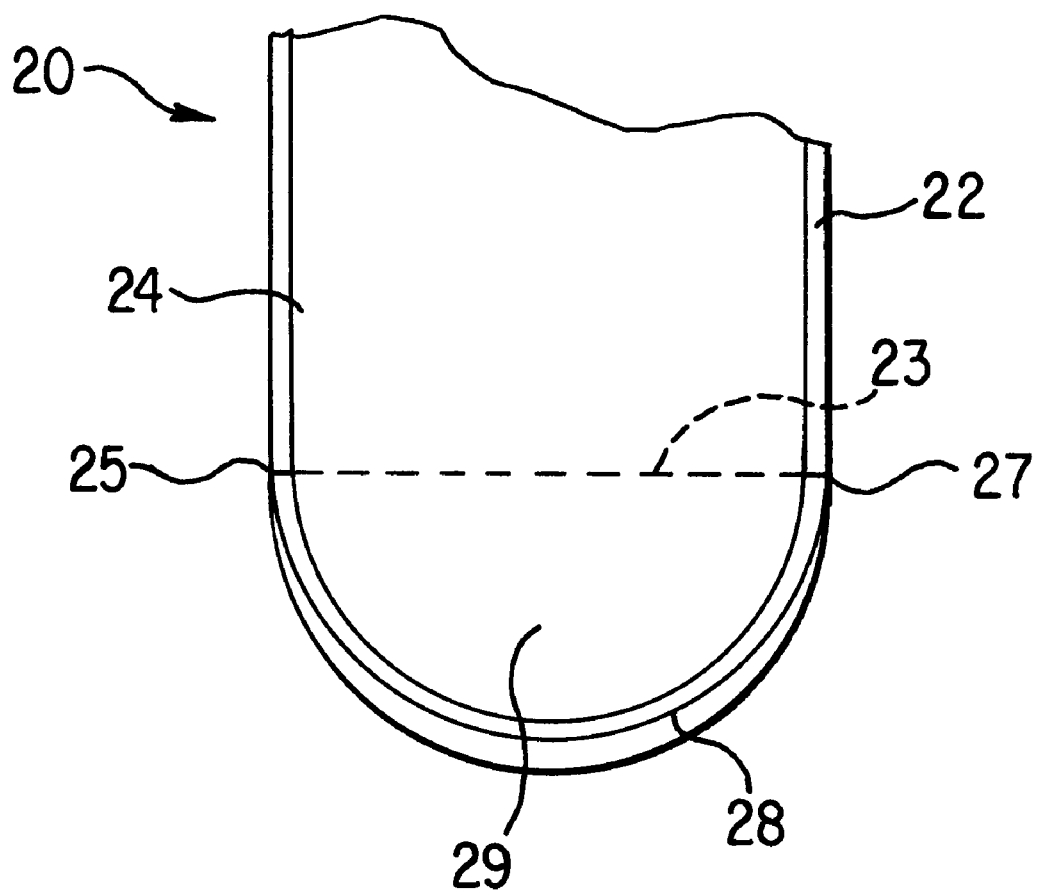
FIG. 4 illustrates a schematic view of a portion of the end-seal patch bag illustrated in FIGS. 1, 2, and 3.

FIG. 4 illustrates a schematic view of a portion of end-seal patch bag 20 illustrated in FIGS. 1, 2, and 3. More particularly, FIG. 4 is directed to illustrating that portion of the surface of end seal bag 22 which is encompassed by convex end seal 28 together with straight line 23 (albeit an imaginary straight line, illustrated as a dashed line) extending from first seal endpoint 25 to second seal endpoint 27. It should be noted that a portion of patch 24 covers a region (of the outside surface of bag 22) which is bounded by i.e., encompassed by, curved (i.e., convex) seal 28 and straight line 23 which connects first seal endpoint 25 with second seal endpoint 27.

Figure 5:
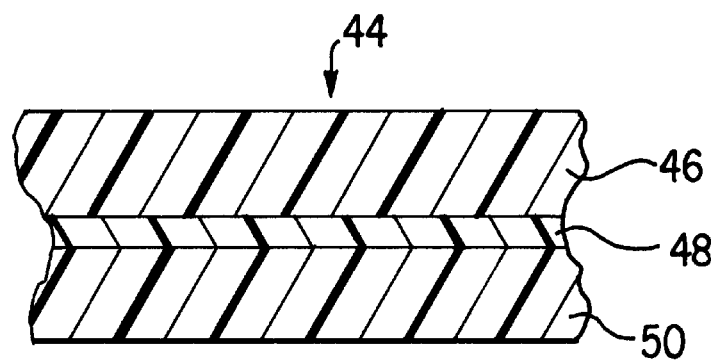
FIG. 5 illustrates a cross-sectional view of a preferred multilayer film suitable for use as the patch in the patch-bag according to FIG. 1.

FIG. 5 illustrates a cross-sectional view of preferred multilayer film 44 for use as the stock material from which patches 24 and 26 are formed. Multilayer film 44 has a physical structure, in terms of number of layers, layer thickness, and layer arrangement and orientation in the patch bag, and a chemical composition in terms of the various polymers, etc. present in each of the layers, as set forth in Table I, below.

TABLE I

| Layer Designation | Layer Function | Chemical Identity | Layer Thickness (mils) |
|---|---|---|---|
| 46 | outside and puncture resistant | 87% LLDPE #1; 10% EVA #1; 3% antiblock masterbatch #1 | 2.0 |
| 48 | tie layer (self-weld) | EVA #2 | 0.7 |
| 50 | inside and puncture resistant | 87% LLDPE #1; 10% EVA #1; 3% antiblock masterbatch #1 | 2.0 |

LLDPE #1 was DOWLEX 2045 (TM) linear low density polyethylene, obtained from the Dow Chemical Company of Midland, Mich. EVA #1 was ELVAX 3128 (TM) ethylene/vinyl acetate copolymer having a 9% vinyl acetate content, obtained from E.I. DuPont de Nemours, of Wilmington, Del. EVA #2 was ELVAX 3175 (TM) ethylene/vinyl acetate copolymer having a 28% vinyl acetate content, obtained from E.I. DuPont de Nemours, of Wilmington, Del. Antiblock masterbatch #1 was used in either of two different grades. The first grade, a clear masterbatch, was a masterbatch known as 10,075 ACP SYLOID CONCENTRATE (TM) obtained from Technor Apex Co. of Pawtucket, R.I. The second grade, a creme colored masterbatch, was a masterbatch known as EPC 9621C CREAM COLOR SYLOID CONCENTRATE (TM), also obtained from Technor Apex Co. of Pawtucket, R.I. The primary difference between these two masterbatches is that of color, which is both aesthetic, and potentially functional in that photosensor alignment means for accurate registration of the patches on the bags can utilize the coloration in the patch for detection of the location of the patch.

Figure 6:
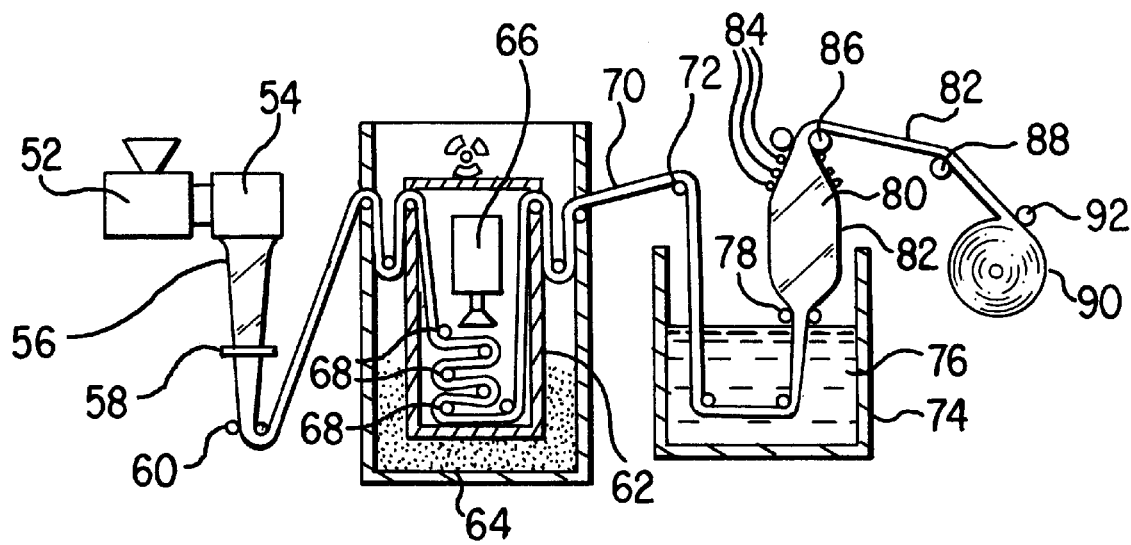
FIG. 6 illustrates a schematic view of a preferred process for making the multilayer film of FIG. 5.

FIG. 6 illustrates a schematic of a preferred process for producing the multilayer film of FIG. 5. In the process illustrated in FIG. 6, solid polymer beads (not illustrated) are fed to a plurality of extruders 52 (for simplicity, only one extruder is illustrated). Inside extruders 52, the polymer beads are forwarded, melted, and degassed, following which the resulting bubble-free melt is forwarded into die head 54, and extruded through annular die, resulting in tubing 56 which is 540 mils thick, more preferably 20–30 mils thick, still more preferably, about 25 mils thick.

After cooling or quenching by water spray from cooling ring 58, tubing 56 is collapsed by pinch rolls 60, and is thereafter fed through irradiation vault 62 surrounded by shielding 64, where tubing 56 is irradiated with high energy electrons (i.e., ionizing radiation) from iron core transformer accelerator 66. Tubing 56 is guided through irradiation vault 62 on rolls 68. Preferably, the irradiation of tubing 56 is at a level of about 7 MR.

After irradiation, irradiated tubing 70 is directed over guide roll 72, after which irradiated tubing 70 passes into hot water bath tank 74 containing water 76. The now collapsed irradiated tubing 70 is submersed in the hot water for a retention time of at least about 5 seconds, i.e., for a time period in order to bring the film up to the desired temperature, following which supplemental heating means (not illustrated) including a plurality of steam rolls around which irradiated tubing 70 is partially wound, and optional hot air blowers, elevate the temperature of irradiated tubing 70 to a desired orientation temperature of from about 240° F.–250° F. Thereafter, irradiated film 70 is directed through nip rolls 78, and bubble 80 is blown, thereby transversely stretching irradiated tubing 70. Furthermore, while being blown, i.e., transversely stretched, irradiated film 70 is drawn (i.e., in the longitudinal direction) between nip rolls 78 and nip rolls 86, as nip rolls 86 have a higher surface speed than the surface speed of nip rolls 78. As a result of the transverse stretching and longitudinal drawing, irradiated, biaxially-oriented, blown tubing film 82 is produced, this blown tubing preferably having been both stretched at a ratio of from about 1:1.5–1:6, and drawn at a ratio of from about 1:1.5–1:6. More preferably, the stretching and drawing are each performed at a ratio of from about 1:2–1:4. The result is a biaxial orientation of from about 1:2.25–1:36, more preferably, 1:4–1:16.

While bubble 80 is maintained between pinch rolls 78 and 86, blown tubing 82 is collapsed by rolls 84, and thereafter conveyed through pinch rolls 86 and across guide roll 88, and then rolled onto wind-up roll 90. Idler roll 92 assures a good wind-up.

Preferably, the stock film from which the bag is formed has a total thickness of from about 1.5 to 5 mils; more preferably, about 2.5 mils. Preferably the stock film from which the bag is formed is a multilayer film having from 3 to 7 layers; more preferably, 4 layers.

Figure 7:
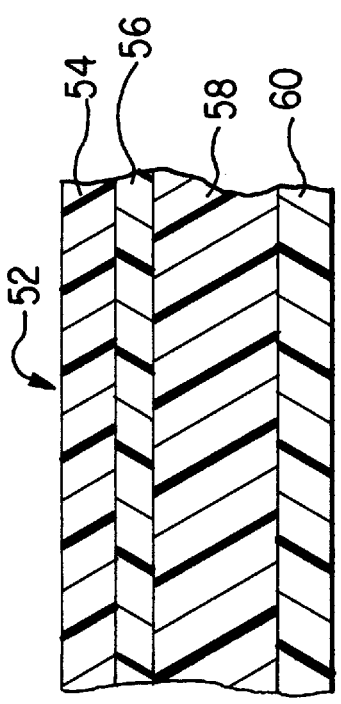
FIG. 7 illustrates a cross-sectional view of a preferred multilayer film suitable for use as the bag in the patch-bag according to FIG. 1.

FIG. 7 illustrates a cross-sectional view of preferred multilayer film 52 for use as the tubing film stock from which bag 22 is formed. Multilayer film 52 has a physical structure, in terms of number of layers, layer thickness, and layer arrangement and orientation in the patch bag, and a chemical composition in terms of the various polymers, etc. present in each of the layers, as set forth in Table II, below.

TABLE II

| Layer Designation | Layer Function | Layer Chemical Identity | Layer Thickness (mils) |
|---|---|---|---|
| 54 | outside and abuse layer | EVA #1 | 0.56 |
| 56 | barrier layer | 96% VDC/MA #1; 2% epoxidized soybean oil; and 2% bu-A/MA/bu-MA terpolymer | 0.2 |
| 58 | puncture-resistant | 80% LLDPE #1 & 20% EBA #1 | 1.25 |
| 60 | sealant and inside layer | EVA #1 | 0.33 |

EVA #1 was the same ethylene/vinyl acetate copolymer described above. VDC/MA #1 was SARAN MA-134 (1 vinylidene chloride/methyl acrylate copolymer, obtained from the Dow Chemical Company. The epoxidized soybean oil was PLAS-CHEK 775 (TM) epoxidized soybean oil, obtained from the Bedford Chemical Division of Ferro Corporation, of Walton Hills, Ohio. Bu-A/MA/bu-MA terpolymer was METABLEN L-1000 (TM) butyl acrylate/methyl methacrylate/butyl methacrylate terpolymer, obtained from Elf Atochem North America, Inc., of 2000 Market Street, Philadelphia, Pa. 19103. EBA #1 was EA 705-009 (TM) ethylene/butyl acrylate copolymer containing 5% butyl acrylate, obtained from the Quantum Chemical Company of Cincinnati, Ohio. Alternatively, EBA #1 can be EA 719-009 (TM) ethylene/butyl acrylate copolymer, having a butyl acrylate content of 18.5%, also obtained from Quantum Chemical Company.

Figure 8:
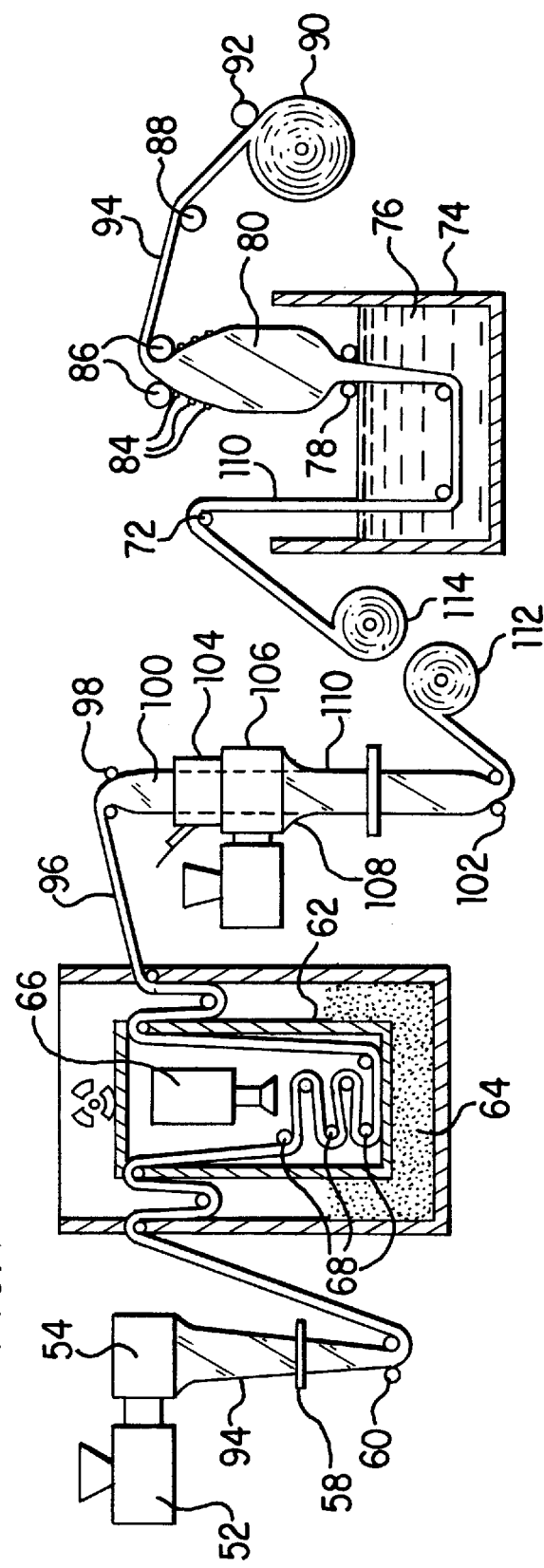
FIG. 8 illustrates a schematic view of a preferred process for making the multilayer film of FIG. 7.

FIG. 8 illustrates a schematic of a preferred process for producing the multilayer film of FIG. 7. In the process illustrated in FIG. 8, solid polymer beads (not illustrated) are fed to a plurality of extruders 52 (for simplicity, only one extruder is illustrated). Inside extruders 52, the polymer beads are forwarded, melted, and degassed, following which the resulting bubble-free melt is forwarded into die head 54, and extruded through an annular die, resulting in tubing 94 which is 10–30 mils thick, more preferably 15–25 mils thick.

After cooling or quenching by water spray from cooling ring 58, tubing 94 is collapsed by pinch rolls 60, and is thereafter fed through irradiation vault 62 surrounded by shielding 64, where tubing 94 is irradiated with high energy electrons (i.e., ionizing radiation) from iron core transformer accelerator 66. Tubing 94 is guided through irradiation vault 62 on rolls 68. Preferably, tubing 94 is irradiated to a level of about 4.5 MR.

After irradiation, irradiated tubing 96 is directed through pinch rolls 98, following which tubing 96 is slightly inflated, resulting in trapped bubble 100. However, at trapped bubble 100, the tubing is not significantly drawn longitudinally, as the surface speed of nip rolls 102 are about the same speed as nip rolls 98. Furthermore, irradiated tubing 96 is inflated only enough to provide a substantially circular tubing without significant transverse orientation, i.e., without stretching.

Slightly inflated, irradiated tubing 96 is passed through vacuum chamber 104, and thereafter forwarded through coating die 106. Second tubular film 108 is melt extruded from coating die 106 and coated onto slightly inflated, irradiated tube 96, to form two-ply tubular film 110. Second tubular film 108 preferably comprises an $O_2$-barrier layer, which does not pass through the ionizing radiation. Further details of the above-described coating step are generally as set forth in U.S. Pat. No. 4,278,738, to BRAX et. al., which is hereby incorporated by reference thereto, in its entirety.

After irradiation and coating, two-ply tubing film 110 is wound up onto windup roll 112. Thereafter, windup roll 112 is removed and installed as unwind roll 114, on a second stage in the process of making the tubing film as ultimately desired. Two-ply tubular film 110, from unwind roll 114, is unwound and passed over guide roll 72, after which two-ply tubular film 110 passes into hot water bath tank 74 containing water 76. The now collapsed, irradiated, coated tubular film 110 is submersed in hot water 76 (having a temperature of about 210° F.) for a retention time of at least about 5 seconds, i.e., for a time period in order to bring the film up to the desired temperature for biaxial orientation. Thereafter, irradiated tubular film 110 is directed through nip rolls 78, and bubble 80 is blown, thereby transversely stretching tubular film 110. Furthermore, while being blown, i.e., transversely stretched, nip rolls 86 draw tubular film 110 in the longitudinal direction, as nip rolls 86 hi have a surface speed higher than the surface speed of nip rolls 78. As a result of the transverse stretching and longitudinal drawing, irradiated, coated biaxially-oriented blown tubing film 94 is produced, this blown tubing preferably having been both stretched in a ratio of from about 1:1.5–1:6, and drawn in a ratio of from about 1:1.5–1:6. More preferably, the stretching and drawing are each performed a ratio of from about 1:2–1:4. The result is a biaxial orientation of from about 1:2.25–1:36, more preferably, 1:4–1:16. While bubble 80 is maintained between pinch rolls 78 and 86, blown tubing 94 is collapsed by rolls 84, and thereafter conveyed through pinch rolls 86 and across guide roll 88, and then rolled onto wind-up roll 90. Idler roll 92 assures a good wind-up.

The polymer components used to fabricate bag and patch films which can be used to make a patch bag according to the present invention may also contain appropriate amounts of other additives normally included in such compositions. These include slip agents such as talc, antioxidants, fillers, dyes, pigments and dyes, radiation stabilizers, antistatic agents, elastomers, and the like additives known to those of skill in the art of packaging films.

In one preferred embodiment, the entire patch is pigmented to provide it with decreased transparency, and is preferably cream colored. Printing can be on the patch film and/or on the bag film. If the bag is printed, the print is preferably on the outside surface of the bag. The patch may be printed on its outside surface or the surface which is laminated to the bag film. Printing between the patch film and the bag film, i.e., trapped print, is less subject to being damaged by abuse.

The multilayer films used to make the patch bag of the present invention are preferably irradiated to induce crosslinking, as well as corona treated to roughen the surface of the films which are to be adhered to one another. In the irradiation process, the film is subjected to an energetic radiation treatment, such as corona discharge, plasma, flame, ultraviolet, X-ray, gamma ray, beta ray, and high energy electron treatment, which induce cross-linking between molecules of the irradiated material. The irradiation of polymeric films is disclosed in U.S. Pat. No. 4,064,296, to BORNSTEIN, et. al., which is hereby incorporated in its entirety, by reference thereto. BORNSTEIN, et. al. discloses the use of ionizing radiation for crosslinking the polymer present in the film.

Radiation dosages are referred to herein in terms of the radiation unit "RAD", with one million RADS, also known as a megarad, being designated as "MR", or, in terms of the radiation unit kiloGray (kGy), with 10 kiloGray representing 1 MR, as is known to those of skill in the art. A suitable radiation dosage of high energy electrons is in the range of up to about 16–166 kGy, more preferably about 44–139 kGy, and still more preferably, 80–120 kGy. Preferably, irradiation is carried out by an electron accelerator and the dosage level is determined by standard dosimetry methods. Other accelerators such as a van der Graaf or resonating transformer may be used. The radiation is not limited to electrons from an accelerator since any ionizing radiation may be used.

As used herein, the phrases "corona treatment" and "corona discharge treatment" refer to subjecting the surfaces of thermoplastic materials, such as polyolefins, to corona discharge, i.e., the ionization of a gas such as air in close proximity to a film surface, the ionization initiated by a high voltage passed through a nearby electrode, and causing oxidation and other changes to the film surface, such as surface roughness.

Corona treatment of polymeric materials is disclosed in U.S. Pat. No. 4,120,716, to BONET, issued Oct. 17, 1978, herein incorporated in its entirety by reference thereto, discloses improved adherence characteristics of the surface of polyethylene by corona treatment, to oxidize the polyethylene surface. U.S. Pat. No. 4,879,430, to HOFFMAN, also hereby incorporated in its entirety by reference thereto, discloses the use of corona discharge for the treatment of plastic webs for use in meat cook-in packaging, with the corona treatment of the inside surface of the web to increase the adhesion of the meat to the adhesion of the meat to the proteinaceous material.

Although corona treatment is a preferred treatment of the multilayer films used to make the patch bag of the present invention, plasma treatment of the film may also be used.

The patches for a preferred patch bag of the present invention as illustrated for example in FIGS. 1, 2, and 3, can be manufactured by a preferred process as illustrated in FIG. 6, discussed in detail above. The process of FIG. 6 comprises the steps of: (A) coextruding a first thermoplastic film; (B) orienting the first thermoplastic film in a machine direction and a transverse direction, so that a first biaxially-oriented, heat-shrinkable, thermoplastic film is produced; (C) cutting a first biaxially-oriented, heat-shrinkable thermoplastic patch from the first biaxially-oriented heat-shrinkable, thermoplastic film; (D) coextruding a second thermoplastic film (E) orienting the second thermoplastic film in the machine direction and the transverse direction, so that a second biaxially-oriented, heat-shrinkable, thermoplastic film is produced; (F) cutting a second biaxially-oriented, heat-shrinkable thermoplastic patch, from the second biaxially-oriented, heat-shrinkable, thermoplastic film; (G) adhering the first and second biaxially-oriented, heat-shrinkable, thermoplastic patches to a surface of the biaxially-oriented, heat-shrinkable film preferably in the form of a tubing, in a manner so that the first patch has a first-patch-overhang-region, and the second patch has a second-patch-overhang-region, and at least a portion of said first-patch-overhang-region is adhered to said second-patch-overhang-region; and (H) sealing and cutting the tubing having the first and second patches adhered thereto, so that a patch bag is formed. Preferably, the first patch and the second patch are both cut from one biaxially-oriented, heat-shrinkable, thermoplastic film. Preferably, the one biaxially-oriented, heat-shrinkable, thermoplastic film, from which the first and second patches are cut, comprises a first multilayer film. Preferably, the tubing comprises a second multilayer film.

Figure 9:
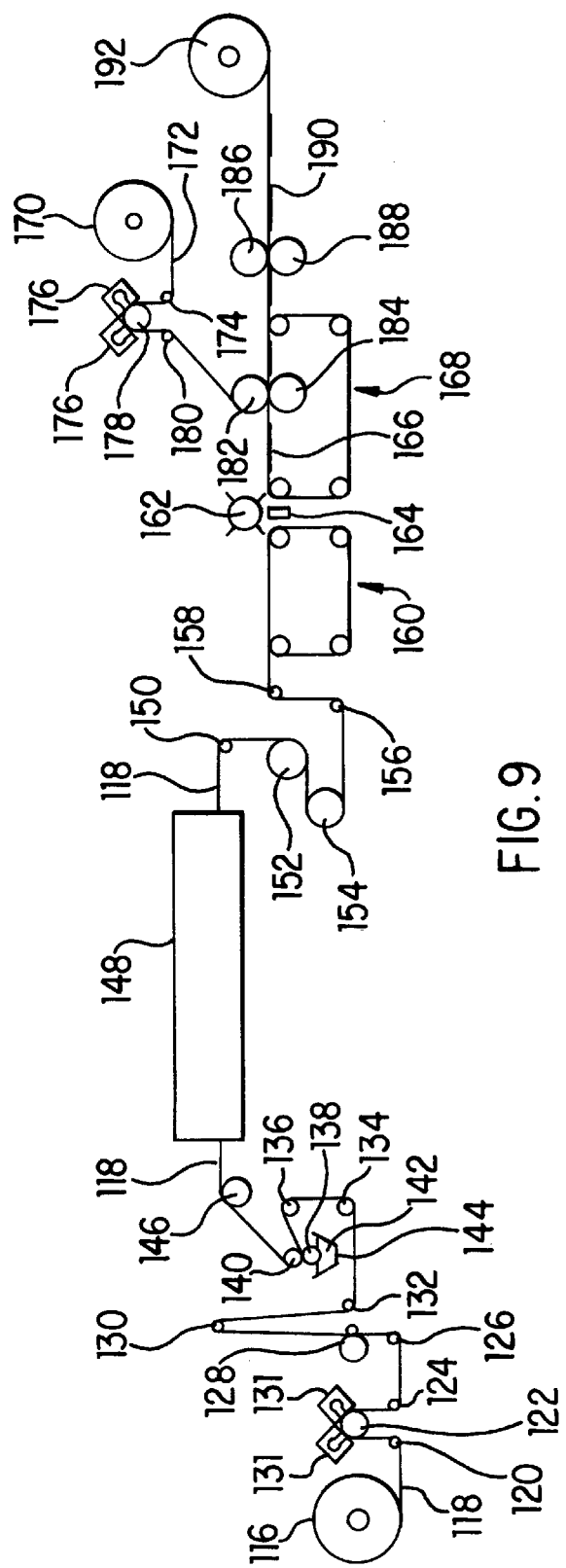
FIG. 9 illustrates a schematic view of a preferred process for making the patch bag of FIG. 1, using the films of FIGS. 5 and 7, as respectively produced by the processes of FIGS. 6 and 8.

Preferably, the tubing having the first and second patches adhered thereto is produced by the process illustrated in FIG. 9, also discussed above. The process of FIG. 9 comprises the steps of: (A) coextruding a multilayer thermoplastic film tube having an inside film layer and an outside film layer, the inside layer of said thermoplastic tube comprising a first ethylene vinyl acetate copolymer and the outside layer of said tube comprising a composition comprising linear low density polyethylene and a second ethylene vinyl acetate copolymer; (B) applying a sufficient amount of a particulate to an interior surface of the film tube, so that upon collapsing, the tube does not self adhere, but so that, upon drawing (as described in detail below), the drawn tubing can be adhered to itself; (C) collapsing the film tube; (D) irradiating the collapsed tube, resulting in an irradiated tube; (E) opening, inflating, and extrusion coating the tube with at least an $O_2$-barrier layer, resulting in a two-ply tubular film; (F) heating, drawing, and stretching the two-ply tubular film, resulting in a biaxially-oriented tubing; (G) winding up the biaxially-oriented tubing.

In the bag-making process, if an end-seal patch bag is the desired product, the tubing having the first and second patches adhered thereto is sealed and cut so that an end-seal bag is produced. FIG. 9 illustrates a schematic representation of a preferred process for manufacturing a patch bag according to the present invention (e.g., a patch bag as illustrated in FIGS. 1, 2, and 3) from the films as illustrated in FIGS. 5 and 7, which are prepared according to processes as illustrated in FIGS. 6 and 8, respectively.

In FIG. 9, patch film roll 116 supplies patch film 118. Patch film 118 is directed, by idler roll 120, to corona treatment devices 131 which subject the upper surface of patch film 118 to corona treatment as patch film 118 passes over corona treatment roll 122. After corona treatment, patch film 118 is directed, by idler rolls 124 and 126, into (optional) printing roll 128.

Patch film 118 is thereafter directed over idler rolls 130, 132, 134, and 136, after which patch film 118 is passed between a small gap (i.e., a gap wide enough to accommodate patch film 118 passing therethrough while receiving an amount of adhesive which corresponds with a dry coating, i.e., weight after drying, of about 45 milligrams per 10 square inches of patch film) between adhesive application roll 138 and adhesive metering roll 140. Adhesive application roll 138 is partially immersed in adhesive 142 supplied to trough 144. As adhesive roll 138 rotates counterclockwise, adhesive 142, picked up by the immersed surface of adhesive roll 138, moves upward, contacts, and is metered onto, the full width of one side of patch film 118, moving in the same direction as the surface of adhesive roll 138. [Examples of suitable types of adhesives include thermoplastic acrylic emulsions, solvent based adhesives and high solids adhesives, ultraviolet-cured adhesive, and electron-beam cured adhesive, as known to those of skill in the art. The presently preferred adhesive is a thermoplastic acrylic emulsion known as RHOPLEX N619 (TM) thermoplastic acrylic emulsion, obtained from the Rohm & Haas Company, at Dominion Plaza Suite 545, 17304 Preston Rd., Dallas, Tex. 75252, Rohm & Haas having headquarters at 7th floor, Independence Mal West, Philadelphia, Pa. 19105.] Patch film 118 thereafter passes so far around adhesive metering roll 140 (rotating clockwise) that the adhesive-coated side of patch film 118 is in an orientation wherein the adhesive is on the top surface of patch film 118, as adhesive-coated patch film 118 moves between adhesive metering roll 140 and idler roll 146.

Thereafter, adhesive-coated patch film 118 is directed over drying oven entrance idler roll 146, and passed through oven 148 within which patch film 118 is dried to a degree that adhesive 142 on patch film 118 becomes tacky. Upon exiting oven 148, patch film 118 is directed partially around oven-exit idler roll 150, following which patch film 118 is cooled on chill rolls 152 and 154, each of which has a surface temperature of about 40–45° F., and a diameter of about 12 inches. The cooling of patch film 118 is carried out in order to stabilize patch film 118 from further shrinkage.

Thereafter, patch film 118 is directed, by idler rolls 156 and 158, onto a belt of pre-cutting vacuum conveyor assembly 160, and thereafter forwarded to a rotary scissors-type knife having upper rotary blade assembly 162 and lower blade 164, the knife cutting across the width of patch film 118 in order to form patches 166. Patches 166 are forwarded and held on top of a belt of post-cutting vacuum conveyor assembly 168. While patches 166 are held on the belt of post-cutting vacuum conveyor assembly 168, tubing-supply roll 170 supplies biaxially oriented, lay-flat film tubing 172, which is directed, by idler roll 174, to corona treatment devices 176 which subject the upper surface of lay-flat tubing film 172 to corona treatment as lay-flat tubing film 172 passes over corona treatment roll 178. After corona treatment, lay-flat tubing film 172 is directed, by idler roll 180, partially around the surface of upper pre-lamination nip roll 182, and through the nip between upper prelaminating nip roll 182 and lower prelaminating nip roll 184, the pre-laminating nip rolls being above and below the post-cutting vacuum conveyor belt. Prelaminating nip rolls 182 and 184 position patches 166 onto the now lower, corona-treated outside surface of lay-flat film tubing 172. After passing through the nip between prelaminating nip rolls 182 and 184, lay-flat tubing 172, having patches 166 laminated intermittently thereon, exits off the downstream end of the post-cutting vacuum conveyor assembly 168, and is directed through the nip between upper laminating nip roll 186 and lower laminating nip roll 188, these rolls exerting pressure (about 75 psi) in order to secure patches 166 to lay-flat tubing 172, to result in patch-laminated lay-flat tubing 190. Thereafter, patch-laminated lay-flat tubing 190 is wound up to form rewind roll 192, with rewind roll 192 having the laminated patches thereon oriented towards the outer-facing surface of rewind roll 192.

In a subsequent process not separately illustrated, rewind roll 192 is removed from its winder and is rewound so that the resulting roll will have the curved patch ends "downstream." In this manner, upon unwinding of the rewound roll, the patches adhered to the tubing will be in the proper orientation (i.e., a curved-edge-downstream orientation) for the adhesion of identical patches to the other side of the tubing, by positioning the rewound roll in the place of tubing supply roll 170. That is, the process of FIG. 8, described immediately above, is repeated, wherein a second set of patches is laminated to patch-laminated lay-flat tubing 192, this second set of patches being applied to the other side of patch-laminated lay-flat tubing 192. Of course, the second set of patches are accurately aligned and registered so that they are substantially aligned with the positioning of the first set of patches laminated to lay-flat tubing film 172. In order to achieve accurate alignment, photosensors (i.e., photoeyes, etc.), not illustrated, are used to detect the location of the patch. An appropriate location for such a photosensor is upstream of upper pre-lamination roll 182, below the patch-laminated lay-flat tubing.

Throughout the process described above, patches 166 can have a width less than, equal to, or greater than, the width of lay-flat tubing film 172, so that the patches respectively: leave uncovered regions along the sides of the bag, go to the edge of the lay-flat tubing, or, overhang the side edges of lay-flat tubing film 172. Regardless of which of these three alternatives are chosen for the process, the first set of patches applied are preferably matched up, i.e., substantially aligned, with the patch overhangs of the second set of patches, i.e., applied to the second (uncovered) side of lay-flat tubing film 172. Once both sets of patches have been applied to lay-flat tubing film 172, the resulting two-patch tubing is directed into a bag-making machine, in a process not illustrated.

In general, the heat seal or seals can be made using a hot bar (heat seal) or a nichrome wire fixed to a chilled metal bar (impulse seal), as is known to those of skill in the art, or any other sealing means known to those of skill in the art, such as ultrasonic radiation, radio frequency radiation, and laser.

The preferred sealing means is an impulse sealer. Films which are predominantly polyethylene are generally sealed using impulse sealing or hot bar sealing. Both linear and shaped seals can be formed, as is known to those of skill in the art.

Preferably, there is simultaneous sealing and cutting of the tubing having the patches adhered thereto. Preferably, a seal is formed between two pairs of aligned patches on the continuous tubing, about one-half to three-quarters of an inch downstream of the upstream pair of aligned patches. The tubing is cut about one-half to three-quarters of an inch downstream of the position at which the seal is made, to result in a bag as illustrated in FIGS. 1, 2, and 3.

Figure 10:
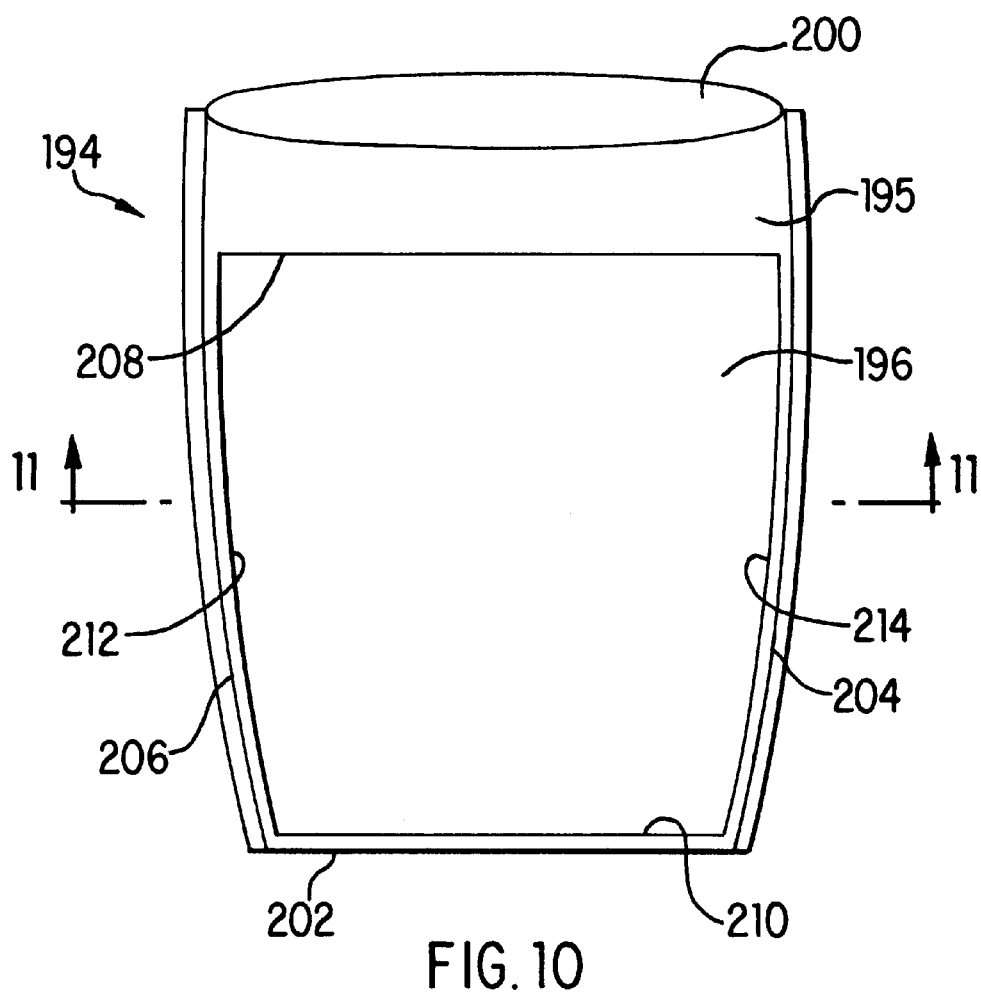
FIG. 10 illustrates a schematic of a side seal patch bag according to the present invention, in a lay-flat view.
Figure 11:
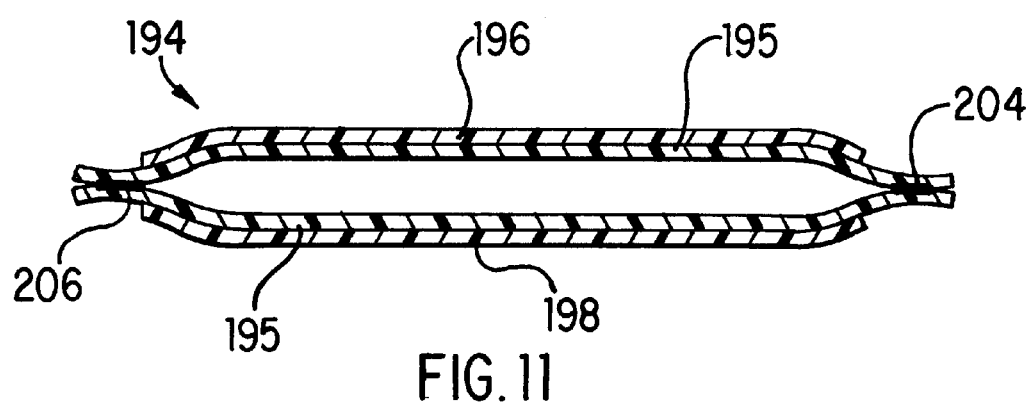
FIG. 11 illustrates a cross-sectional view of the side-seal patch bag illustrated in FIG. 10, taken through section 11—11 of FIG. 10.

As can be readily recognized by those of skill in the art, a process, analogous to the end-seal bag process described immediately above, for the making of side-seal patch bags, for example the side-seal patch bag as illustrated in FIGS. 10 and 11, as well as various other embodiments which can be used to obtain effective full width patch coverage. These alternative embodiments of the bag according to the present invention are described in detail below.

In general, sealing and cutting of tubing to produce bags is disclosed in U.S. Pat. No. 3,552,090, U.S. Pat. No. 3,383,746, and U.S. Ser. No. 844,883, filed Jul. 25, 1969, to OWEN, each of these two U.S. patents as well as the U.S. patent application, hereby being incorporated by reference thereto, in their entireties.

FIGS. 10 and 11 illustrate lay-flat and transverse cross-sectional views (respectively) of side-seal patch bag 194, in accordance with the patch bag of the present invention. As can be seen from the cross-sectional view illustrated in FIG. 11, patch bag 194 has bag 195 to which are adhered first patch 196 and second patch 198. Patch bag 194 further comprises open top 200, bottom edge 202, and a pair of curved side seals 204 and 206. Patches 196 and 198 are substantially aligned, and each has straight upper edge 208, straight lower edge 210, and outwardly-curved (i.e., convex) side seals 212 and 214. Although not illustrated as such in FIGS. 10 and 11, preferably side-seal patch bag 194 has only one patch, which extends to cover both sides as well as bottom edge 202.

Optionally, the patch bag in accordance with the present invention can have patches which overhang the bag edges, these overhanging regions of the patches being bonded to one another. Such patch bags comprising overhanging bonded patches are disclosed in copending U.S. patent application (to be assigned), entitled "PATCH BAG HAVING OVERHANGING BONDED PATCHES", filed Jun. 28, 1994, in the name of S. BRADY, et. al., the entirety of which is hereby incorporated by reference thereto.

Although not illustrated, another alternative patch bag according to the present invention has a "full length" patch over, for example, the back side of the bag, and a "less than full length patch" over, for example, the front side of the bag, the bag being in its lay-flat position. This bag further comprises a seal in a region below the bottom edge of the less than fill length patch. In this alternative bag, the seal is preferably made by applying the heat seal bar to the uncovered region of the bag below the "less than full length" patch, so that the resulting seal is stronger than if the seal is formed by passing heat through one or more of the patches.

This patch bag can be produced by adhering a "continuous length" of patch material to a first side of the lay-flat bag tubing, followed by applying a set of separate patches to the second side of the lay-flat bag tubing. Thereafter, the end-seal is made by directly contacting the bag film with the sealing apparatus at "uncovered" regions of the second side of the lay flat tubing. In this manner, at least half of the bottom region of the patch bag can be covered with a patch, while avoiding the need to seal through the patch. A more detailed disclosure of this patch bag can be found in copending U.S. Ser. No. 08/579,712, to T. T. Oberle, filed Dec. 28, 1995, entitled "PATCH BAG HAVING CONTINUOUS PATCH". Of course, this feature is useful regardless of whether or not the patches are overhanging and bonded to one another.

Another alternative patch bag which can be used in the present invention is disclosed in U.S. Pat. No. 5,540,646, to G. K. WILLIAMS and S. A. BRADY, filed Mar. 20, 1995, entitled "METHOD OF MAKING A SHRINKABLE BAG WITH PROTECTIVE PATCH" which is hereby incorporated by reference thereto, in its entirety. This application discloses an end-seal patch bag having at least one patch thereon, preferably two patches thereon, wherein the patches are in a "rotated" position when the patch bag is in its lay-flat position. In accordance with the present invention, one or more edges of the patch are convex in shape, preferably in close proximity to, and substantially parallel to, a convex seal.

In all of the above embodiments of patch bags according to the present invention, patches which do not overhang one or more edges of the bag could alternatively overhang one or more edges of the bag, and vice versa.

Although in general the bag according to the present invention can be used in the packaging of any product, the bag of the present invention is especially advantageous for the packaging of food products, especially fresh meat products. Among the meat products which can be packaged in the films and packages according to the present invention are poultry, pork, beef, lamb, goat, horse, and fish. Still more preferably, the bag of the present invention is used in the packaging of a pair of bone-in whole pork loins.

Although the present invention has been described in connection with the preferred embodiments, it is to be understood that modifications and variations may be utilized without departing from the principles and scope of the invention, as those killed in the art will readily understand. Accordingly, such modifications may be practiced within the scope of the following claims.

What is claimed is:

1. A packaged product, comprising a patch bag an a meat product in the patch bag, wherein:
    (A) the patch bag comprises:
        (i) a bag having a convex bag edge;
        (ii) a convex seal inward of the convex bag edge, the convex seal having a first seal endpoint and a second seal endpoint;
        (iii) a patch adhered to the bag;
        wherein the patch has a convex patch edge, and wherein the patch covers at least a portion of a region of the bag bounded by the convex seal and a straight line connecting the first seal endpoint and the second seal endpoint; and
    (B) the meat product comprises bone.

2. The packaged product according to claim 1, wherein the meat product comprises at least one member selected from the group consisting of poultry, pork, beef, lamb, goat, horse, and fish.

3. The packaged product according to claim 2, wherein the meat product comprises bone-in ham, turkey, chicken, and beef shank.

4. The packaged product according to claim 1, wherein the convex seal is outward of the convex patch edge.

5. The packaged product according to claim 1, wherein the convex seal is inward of the convex patch edge.

6. The packaged product according to claim 1, wherein the bag is an end-seal bag, and wherein the convex seal forms a bottom of the bag.

7. The packaged product according to claim 1, wherein the bag is a side-seal bag, and wherein the convex seal forms a side of the bag.

8. The packaged product according to claim 1, wherein the bag is a pouch having two straight side seals and a convex bottom seal.

9. The packaged product according to claim 1, wherein the bag comprises a first biaxially-oriented, heat-shrinkable film comprising an outside abuse layer, a core $O_2$-barrier layer, and an inside sealant layer, and the patch comprises a second biaxially-oriented, heat-shrinkable film.

10. The packaged product according to claim 9, wherein:
    the outside abuse layer of the bag comprises at least one member selected from the group consisting of ethylene/alpha-olefin copolymer having a density of from about 0.85 to 0.95, propylene/ethylene copolymer, polyamide, ethylene/vinyl acetate copolymer, ethylene/methyl acrylate copolymer, and ethylene/butyl acrylate copolymer;
    the core $O_2$-barrier layer of the bag comprises at least one member selected from the group consisting of ethylene/vinyl alcohol copolymer, polyvinyl chloride, polyvinylidene chloride, polyamide, polyester, and polyacrylonitrile;
    the inside sealant layer comprises at least one member selected from the group consisting of thermoplastic polyolefin, thermoplastic polyamide, thermoplastic polyester, and thermoplastic polyvinyl chloride; and
    the second biaxially-oriented, heat-shrinkable film comprises at least one member selected from the group consisting of ethylene/alpha-olefin copolymer having a density of from about 0.85 to 0.95, propylene/ethylene copolymer, polyamide, ethylene/vinyl acetate copolymer, ethylene/methyl acrylate copolymer, and ethylene/butyl acrylate copolymer.

11. The packaged product according to claim 1, wherein the bag comprises a heat-shrinkable film and the patch comprises a heat shrinkable film.

12. The packaged product according to claim 11, wherein the seal is inward of the convex patch edge.

13. The packaged product according to claim 12, wherein the seal is through the patch and the bag.

14. The packaged product according to claim 1, wherein the seal is through the bag but not through the patch.

15. The packaged product according to claim 11, wherein the bag is an end-seal bag.

16. The packaged product according to claim 1, wherein the seal is outward of the convex patch edge.

17. The packaged product according to claim 16, wherein the patch is adhered to an outside surface of the bag.

18. The packaged product according to claim 17, wherein the patch has a patch width less than a width of the bag.

19. The packaged product according to claim 17, wherein the patch has a patch width greater than a width of the bag.

20. The packaged product according to claim 15, wherein the patch bag has a first patch adhered to a first lay-flat side of the bag, and a second patch adhered to a second lay-flat side of the bag.

21. The packaged product according to claim 20, wherein the two patches are substantially aligned with one another when the patch bag is in its lay-flat position.

* * * * *